United States Patent [19]
Kittrell et al.

[11] Patent Number: 5,196,269
[45] Date of Patent: Mar. 23, 1993

[54] PAPERBOARD LAMINATES HAVING POLAR COPOLYMER/NONPOLAR POLYMER BLEND SURFACE COATINGS

[75] Inventors: James M. Kittrell; Charles F. Gibbons; Allan A. Whillock, all of Mobile; Joe L. Kinsey, Jr., Irvington; Cynthia L. Tanner, Mobile, all of Ala.

[73] Assignee: International Paper Company, Tuxedo Park, N.Y.

[21] Appl. No.: 797,508

[22] Filed: Nov. 22, 1991

Related U.S. Application Data

[63] Continuation-in-part of Ser. No. 552,022, Jul. 13, 1990, abandoned.

[51] Int. Cl.$^5$ .................. B32B 23/08; B32B 27/10
[52] U.S. Cl. ..................... 428/513; 428/514; 428/520; 428/522; 428/537.5; 428/542.8
[58] Field of Search ............... 428/34.2, 513, 514, 428/520, 522, 537.5, 542.8

[56] References Cited

U.S. PATENT DOCUMENTS

| | | | |
|---|---|---|---|
| 4,337,298 | 6/1982 | Karim et al. | 428/461 |
| 4,513,036 | 4/1985 | Thompson et al. | 428/34.2 |
| 4,684,576 | 8/1987 | Tabor et al. | 428/441 |

*Primary Examiner*—Paul J. Thibodeau
*Assistant Examiner*—D. S. Nakarani

[57] ABSTRACT

The present invention relates to a novel coextrusion coating for paper or paperboard substrates. The coextrusion includes a nonpolar polymer layer and a thin exterior skin layer made up of a nonpolar polymer and a polar copolymer. The addition of the polar polymer improves long term treatment level retention which improves long term wettability for printing and gluing adhesion during package or carton formation.

7 Claims, 2 Drawing Sheets

PAPERBOARD LAMINATES HAVING POLAR COPOLYMER/NONPOLAR POLYMER BLEND SURFACE COATINGS

This is a continuation-in-part of copending application Ser. No. 07/552,022 filed on Jul. 13, 1990, now abandoned.

BACKGROUND OF THE INVENTION

This invention relates to the use of polar copolymer/nonpolar polymer blends as thermoplastic outer surface coating layers for paper and paperboard products. The novel coatings function to: maintain acceptable treatment levels over a long period of time; have normal heat-sealing properties; and have good gluing and printing characteristics.

Exterior coatings which have been applied to paper and/or paperboard layers function to provide surfaces for heat-sealing with interior laminate layers during package formation steps. They also function as an exterior moisture barrier. Additionally, these exterior coating layers are surfaces which must be printable and receptive to gluing operations.

Typically, the outer or exterior coating layer for a paper or paperboard substrate has consisted of a nonpolar thermoplastic polyolefin polymer. Common polymers utilized for these coating layers are polymers such as low density polyethylene, linear low density polyethylene, medium density polyethylene, linear medium density polyethylene, high density polyethylene, polypropylene, as well as blends thereof. These commonly used polymers, all nonpolar in nature, are economically desirable and heat-seal well with like nonpolar polymers, which are often utilized either alone or coextruded with barrier polymers for an interior layer of a laminate packaging, or container structure.

These commonly used nonpolar polymers cause problems during carton printing especially when water based polar inks are used. These water based polar inks do not adhere well to the commonly used nonpolar polymer coating layer. Additionally, significant problems occur during gluing, due to the nonpolar nature of the coating layer. These water based materials will "bead-up" on the surface of the nonpolar polymer coatings. As a result, poor coverage and adhesion occurs.

In the past, corona discharge treatment or flame treatment of the coating layer has been employed to improve the wettability of the nonpolar polymer layer. The surface characteristics of these nonpolar polymer coatings can be modified by corona discharge or direct flame treatment to make the surface more polar, and therefore, more wettable by water based inks and glues. This treatment is required for good ink adhesion in printing, and for good glue adhesion for package sealing. Corona discharge treatment levels and, to a lesser degree, direct flame treatment levels, which are directly proportional to wettability, decline proportionally over time. Extrusion coaters frequently treat production to very high levels with the intention that the customer receive an acceptable treatment level after the normal delays of shipping and storage. However, corona discharge treating of nonpolar polymers to very high levels often results in the production of numerous polymer pinholes. These pinholes are formed by burning through the web due to treater arcing. Such pinholes compromise package integrity. Treatment loss is a particular problem on material stored for long periods of time, or shipped overseas, due to the long transit time. Transit time can result in delays of several months to a year from the time of production to the time of printing and converting. Consequently, pretreated coatings must be retreated to raise the dissipated treatment levels. Such pretreatment is time-consuming and expensive.

The use of direct flame treatment produces a more permanent treatment level, but often results in streaks, loss of gloss, or other imperfections in high-gloss polyethylene or polypropylene surfaces.

The need for water-wettable printing surfaces on nonpolar polymers has increased. In the past, printers and converters could use solvent based inks and glues to get satisfactory adhesion to untreated nonpolar polymer surfaces. These solvent based inks and glues cause environmental problems due to solvent emissions into the air resulting from ink and glue drying and waste water stream pollution from press clean up. As a result, most printing and converting operations have changed to water based inks and glues, rather than installing expansive and expensive solvent recovery and clean up systems.

It is an objective of the present invention to economically produce thermoplastic type polymer coated paper or paperboard products that maintain treatment levels over a long period of time.

It is a further object of the present invention to economically produce thermoplastic type polymer coated paper or paperboard products that have normal heat sealing, gluing, and printing characteristics.

Applicant is owner of numerous patents which relate to paper or paperboard coated products such as U.S. Pat. Nos. 4,698,246; 4,701,360; 4,789,575; 4,802,943; 4,806,399; 4,859,513; 4,861,526; 4,880,701; 4,888,222; 4,921,733; and 4,929,476. These laminate structures use polyethylene, polypropylene, and other nonpolar polymers as an exterior coating layer.

SUMMARY OF THE INVENTION

The present invention seeks to overcome the disadvantages of using nonpolar thermoplastic coatings for paper or paperboard products. The invention involves a coextrusion exterior coating of a nonpolar thermoplastic polymer with a thin skin outer layer of a nonpolar polymer/polar copolymer blend. The coextrusion is then corona discharge treated or flame treated at normal power levels. The presence of the polar component of the blend gives good long term retention of treatment level. The nonpolar component produces normal heat-sealing characteristics.

The polar copolymer/nonpolar polymer coating can also be formed using single layer extrusion coating techniques or extrusion lamination techniques. This coating acts as the surface whereon printing for the resultant container occurs.

DETAILED DESCRIPTION OF THE INVENTION

In accordance with the invention, a novel coextrusion of a nonpolar olefinic thermoplastic polymer with a thin exterior skin layer of nonpolar olefinic thermoplastic polymer and a polar thermoplastic copolymer blend is provided, as an exterior coating for paper or paperboard based packages or containers. This coating can then be corona discharge or flame treated at normal levels with excellent treatment level retention. The coating is easily printed upon with water based inks and is receptive to water based glues.

A preferred use of the coating of the present invention is embodied in a laminate comprising an inner product contact layer of a polyolefinic nonpolar polymer which is located on the interior (non-clay side) of a clay coated folding carton paperboard substrate. The interior coating layer's weight can be 10.8 pounds per 3000 square feet and is preferably a low density polyethylene based material. Coextrusion coated onto the clay outer side of the paperboard is a layer of a polyolefinic polymer, such as low density polyethylene based material, having a preferred weight of 7.8 pounds per 3000 square feet and a skin exterior layer made up of a polar copolymer and a nonpolar polymer blend having a weight of 3.0 pounds per 3000 square feet, the skin layer being the exterior of an assembled carton where printing occurs.

This preferred structure can be then formed into a blank for conversion into a package or container.

A further structure contemplated utilizes liquid packaging and cup grade paperboard substrates as well.

Examples of nonpolar constituents which are contemplated for the blend layer or the nonpolar polyolefinic polymer layer of the coextrusion are low density polyethylene polymer, linear low density polyethylene, linear medium density polyethylene, medium density polyethylene, high density polyethylene, polypropylene or blends thereof.

Polar copolymer resins which are contemplated for the nonpolar polymer/polar copolymer blend layer are ethylene acrylic acid copolymers and ethylene-methacrylic acid copolymers. Additionally, the nonpolar polymer/polar copolymer blend layer could comprise an ethylene based graft copolymer.

Other resins with similar functionality will work equally as well as should be considered as part of this disclosure.

The preferred embodiment of the present invention when using an acid copolymer blend as the polar constituent of the blend layer contains preferably 4.5% total acid content, or higher, to achieve desired results. Acid contents of 9% or higher will result in poor chill roll release on the extrusion coater during layer formation.

Treatment after extrusion may be by corona discharge or by direct flame impingement. The treatment levels remain high even after long periods of time.

Figure 1:
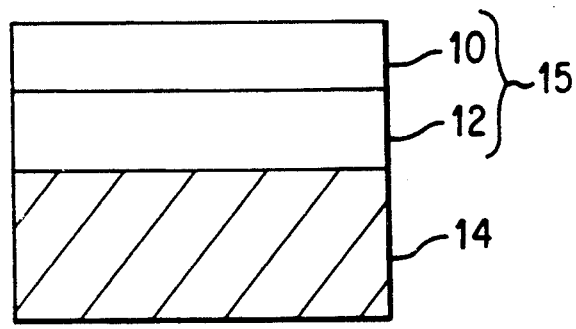
FIG. 1 is a cross-sectional view of a preferred embodiment of a coextrusion coating on a paper substrate embodying the present invention.

FIG. 1 illustrates a paper or paperboard coated structure. The paper or paperboard substrate 14 has coated thereon a coextrusion coating 15 embodying the present invention made up of a nonpolar olefinic polymer layer 12 and an exterior skin layer 10 of a blend of a nonpolar olefinic polymer and a polar copolymer. The blend layer acts as the exterior to facilitate printing when the laminate is assembled into a blank and/or carton.

The nonpolar olefinic polymer layer 12 and the nonpolar olefin polymer constituent of the blend layer could be low density polyethylene polymer, linear low density polyethylene, medium density polyethylene, linear medium density polyethylene, high density polyethylene, polypropylene or blends thereof.

Whereas, polar copolymer resins which are used for the present invention as the polar constituent of the blend are ethylene acrylic acid copolymers and ethylene-methacrylic acid copolymers, also contemplated and used are ethylene based graft copolymers for the nonpolar/polar blend layer.

Figure 2:
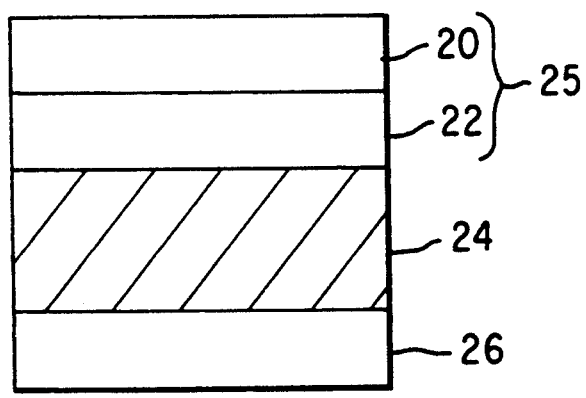
FIG. 2 is a cross-sectional view of a laminate incorporating the novel extrusion embodying the present invention.

FIG. 2 illustrates a laminate which can be utilized as a blank and/or container. The structure incorporates the novel coextrusion exterior coating embodying the invention. The laminate has a paperboard substrate 24, an inner product contact layer 26 of a polyolefin nonpolar polymer and an exterior coextrusion coating layer 25 including a nonpolar polyolefin polymer layer 22 and a thin exterior skin layer 20 comprised of a blend of a polar copolymer and a nonpolar polyolefin polymer.

Figure 3:
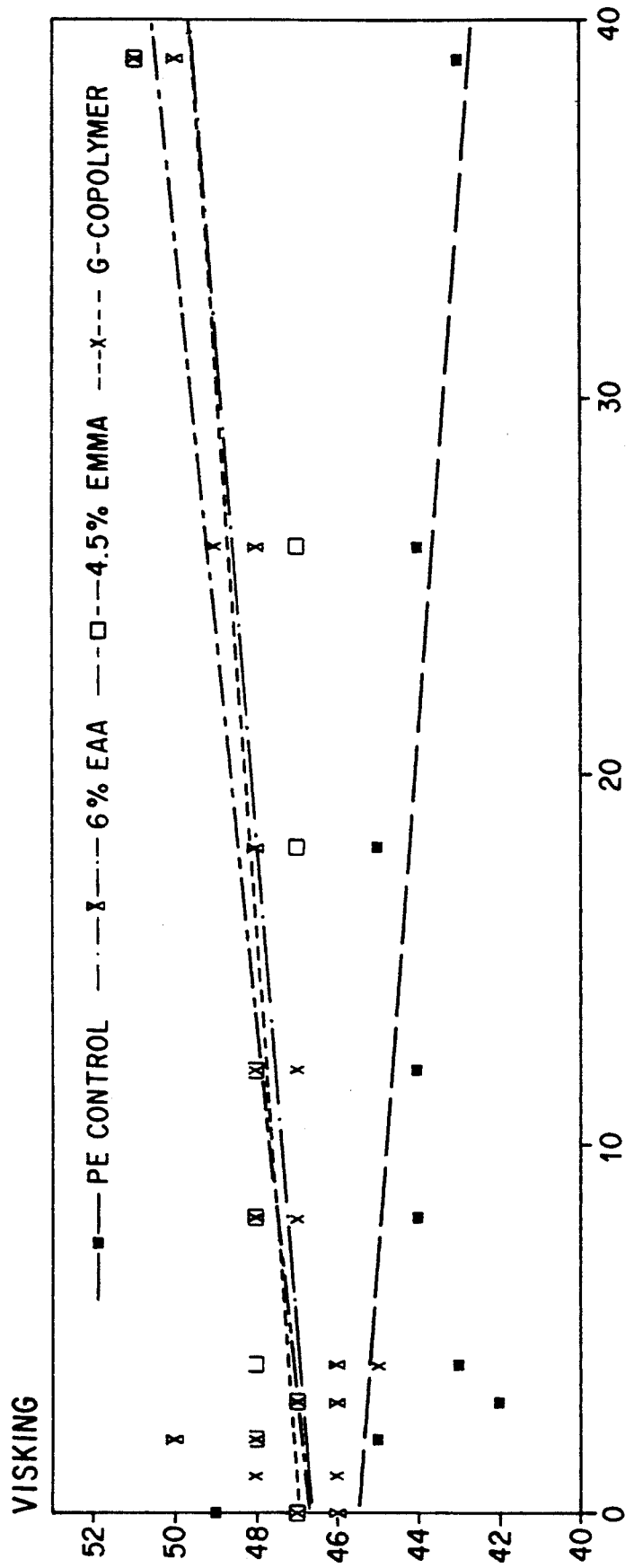
FIG. 3 is a graph showing Visking versus storage time for blends embodying the present invention.

FIG. 3 is a graphic representation of experimental testing utilizing the Visking test for the novel coating blend layers and their treatment retention levels versus storage time. Coating blends containing 6% ethylene acrylic acid (EAA), 4.5% ethylene-methacrylic acid (EMAA), and a skin layer of 100% of an ethylene based graft copolymer (G-COPOLYMER), and a control sample with only nonpolar low density polyethylene (LDPE) were compared. The blends also possess as their nonpolar polymer constituent, where applicable, low density polyethylene.

Surface wettability (treatment level) was tested by adding organic solvent mixtures to the surface of the coating. Both Formamide and Cellosolve were used as solvents. Mixtures of the two solvents were prepared in concentrations shown in Table A for various values of "wetting tension" over which a range of measurements were made. The Table shows values for a 100 millimeter bottle.

A drop of prepared solvent was placed across the face of each sample and then drawn down into a thin film across its face. Observations were made concerning which solvent films began to break up within 5 seconds after drawdown and the bottle number of that solvent was recorded.

The results of the test over time are depicted in FIG. 3. The nonpolar polymer and polar copolymer blends all performed significantly better than the nonpolar low density polyethylene alone over time. Significant breakdown in the treatment level of the low density polyethylene control is clearly seen in the test results. Graphed is Visking, which equates to surface tension in dynes per square centimeter, versus time. Higher numbers are best.

TABLE A

| CONCENTRATIONS OF CELLOSOLVE-FORMAMIDE | | |
|---|---|---|
| Formamide, % by Volume 100 ml. | Cellosolve, % by Volume 100 ml. | (Bottle No.) Wetting Tension |
| 0.0 | 100.0 | 30 |
| 2.0 | 98.0 | 30.5 |
| 4.0 | 96.0 | 31 |
| 7.0 | 93.0 | 31.5 |
| 10.5 | 89.5 | 32 |
| 15.0 | 85.0 | 32.5 |
| 19.0 | 81.0 | 33 |
| 22.5 | 77.5 | 33.5 |
| 26.5 | 73.5 | 34 |
| 30.0 | 70.0 | 34.5 |
| 34.0 | 66.0 | 35 |

TABLE A-continued

CONCENTRATIONS OF CELLOSOLVE-FORMAMIDE

| Formamide, % by Volume 100 ml. | Cellosolve, % by Volume 100 ml. | (Bottle No.) Wetting Tension |
|---|---|---|
| 41.0 | 59.0 | 36 |
| 47.5 | 52.5 | 37 |
| 54.0 | 46.0 | 38 |
| 59.0 | 41.0 | 39 |
| 63.3 | 36.7 | 40 |
| 67.3 | 32.7 | 41 |
| 71.5 | 28.5 | 42 |
| 74.5 | 25.5 | 43 |
| 77.5 | 22.5 | 44 |
| 80.3 | 19.7 | 45 |
| 87.0 | 13.0 | 48 |
| 90.7 | 9.3 | 50 |
| 94.0 | 6.0 | 52 |
| 96.7 | 3.3 | 54 |
| 99.0 | 1.0 | 56 |

A small amount of Victoria Pure Blue FBO 250201 dye is added to increase visibility.

The novel coextrusion coatings significantly outperformed the nonpolar polymer alone over time. Consequently, ink and glue adhesion of water based products is significantly improved even after long periods of time. Treatment levels remain at constant acceptable levels.

The novel nonpolar polymer and polar copolymer blend can be used in a large number of laminate structures as disclosed by Applicants' other patents as well as in any paper or paperboard structure which utilizes water based inks or glues. All of these structures should be incorporated into the teachings of this application.

Notably, the novel structure embodied by the invention seals well with packaging structures incorporating oxygen barrier materials such as ethylene vinyl alcohol copolymer, aluminum foil, and the like.

One preferred structure comprises a paperboard substrate and a coextrusion coated layer of a low density polyethylene polymer and a thin skin layer comprising a blend of a low density polyethylene and a polar copolymer selected from ethylene acrylic acid, ethylene-methacrylic acid or an ethylene based graft copolymer.

These coating structures can be incorporated into almost all container or cartons.

What is claimed is:

1. A paperboard laminate for constructing blanks and containers having an improved exterior coating layer comprising:
    (a) a paperboard substrate having an exterior and an interior side corresponding to the exterior and interior of a blank or container; and
    (b) a coating comprising a layer of polyolefinic polymer located on said exterior side of said substrate and an outermost skin layer comprising a blend of a nonpolar polymer and a polar copolymer located on said polyolefinic polymer layer.

2. A paperboard laminate in accordance with claim 1, wherein said polar copolymer of said skin layer is selected from the group consisting of an ethylene acrylic acid copolymer and an ethylene methacrylic acid copolymer.

3. A paperboard laminate in accordance with claim 2, wherein the acid content of the blend layer comprises from 4.5% to 9% of the blend.

4. A paperboard laminate in accordance with claim 1, wherein said polyolefinic polymer layer is low density polyethylene, linear low density polyethylene, medium density polyethylene, linear medium density polyethylene, high density polyethylene, polypropylene or blends thereof.

5. A paperboard laminate in accordance with claim 1, wherein said nonpolar polymer of said skin layer is low density polyethylene, linear low density polyethylene, medium density polyethylene, linear medium density polyethylene, high density polyethylene, polypropylene or blends thereof.

6. A paperboard laminate in accordance with claim 1, further comprising an interior layer of a nonpolar polyolefinic polymer located on the inner side of said paperboard substrate.

7. A paperboard laminate in accordance with claim 1, wherein said coating layer is coextruded onto said paperboard substrate.

* * * * *